United States Patent [19]
Eriksson et al.

[11] Patent Number: 6,017,449
[45] Date of Patent: Jan. 25, 2000

[54] CONTAINER FOR LIQUID WITH DISPERSION DEVICE

[76] Inventors: Hans Eriksson, PL 7811, Rimbo S-782 93; Kent Isaksson, Vastergarden 30, Norrtälje S-761 94, both of Sweden

[21] Appl. No.: 08/875,122

[22] PCT Filed: Jan. 18, 1996

[86] PCT No.: PCT/SE96/00041

§ 371 Date: Jul. 17, 1997

§ 102(e) Date: Jul. 17, 1997

[87] PCT Pub. No.: WO96/22249

PCT Pub. Date: Jul. 25, 1996

[30] Foreign Application Priority Data

Jan. 19, 1995 [SE] Sweden .................................. 9500216

[51] Int. Cl.⁷ .................................. C02F 1/24; B03D 1/24
[52] U.S. Cl. .................. 210/221.2; 210/202; 210/205; 210/194; 210/256; 261/123; 261/124
[58] Field of Search .............................. 210/221.1, 221.2, 210/703, 194, 202, 205, 256; 261/122.1, 123, 124

[56] References Cited

U.S. PATENT DOCUMENTS

| | | |
|---|---|---|
| 3,015,396 | 1/1962 | Quast . |
| 3,446,488 | 5/1969 | Mail . |
| 3,542,675 | 11/1970 | Mail . |
| 4,070,277 | 1/1978 | Uban et al. . |
| 4,338,192 | 7/1982 | Krasnoff et al. . |
| 4,639,313 | 1/1987 | Zipperian . |
| 5,130,029 | 7/1992 | Suutarinen . |
| 5,154,351 | 10/1992 | Takko . |
| 5,505,881 | 4/1996 | Eades . |

FOREIGN PATENT DOCUMENTS 552305   4/1977   U.S.S.R. .

*Primary Examiner*—Thomas M. Lithgow
*Attorney, Agent, or Firm*—Young & Thompson

[57] ABSTRACT

A device for distributing and dispersing highly pressurized air-saturated water, preferably for use in a flotation tank (1) of a water purification plant, is placed adjacent to inlet openings (2) through which water to be treated in the flotation tank (1) passes. The distribution and dispersion device includes a pre-dispenser (27, 28) which is arranged in a distribution pipe (21, 22) or its supply conduit (24), and which includes a perforated pipe mounted, preferably, coaxially in the distribution pipe or the supply conduit. Air-saturated water passes through the perforations or throttling holes (26) resulting in a first pressure decrease and subsequent dispersion. The water then passes to the distribution pipe (22) from which it passes through one or more openings (23) in the wall of the distribution pipe (22), and is forced out the flotation tank (1) during a further decrease in pressure and dispersion of the water.

8 Claims, 2 Drawing Sheets

CONTAINER FOR LIQUID WITH DISPERSION DEVICE

TECHNICAL FIELD

The present invention relates to a liquid container which includes a liquid inlet and means for delivering pressurized, gas-saturated liquid to the liquid introduced through the inlet in the close vicinity thereof.

DESCRIPTION OF THE BACKGROUND ART

Flotation plants are used to an ever-increasing extent in the purification of water, both drinking water and sewage water, with the intention of increasing the rate at which the water flows through the purification plant and therewith also enable the size of the necessary tanks and thus the purification plant has a whole to be reduced. With regard to drinking water, the requirements of the end product are essentially unitary and the construction of a purification plant is essentially determined by the nature of the water source or procurement. When the water source is a lake or river, coarse particles are normally separated from the water in a screening chamber, whereafter the water is purified chemically and biologically by adding thereto precipitation and flocculating agents in a flocculating chamber. The precipitated particles are then separated from the water, by allowing the particles to settle to the bottom of a sedimentation tank gravitationally. Different types of particles will have different densities and therewith different settling rates. In order for particles of low densities, "light particles", to have time to settle as the water passes through a sedimentation tank, the tank must be given a large surface area so to provide the long period of time taken for such light particles to settle.

Particle separation times can be greatly reduced by flotation processes, in which there are added to the water microscopic air bubbles to which particles or particle flocs in the water adhere. These bubbles also contribute in forming particle flocs and in maintaining floc coherency. Air bubbles rise quickly to the surface of the water, carrying with them the adhered particles and particle flocs, these flocs forming a stable coating of slime on the surface of the water, which can be removed with the aid of scrapers or by intermittently raising the water level in the flotation tank so that the slime coating will flow into a slime chute provided at one edge of the tank.

The microscopic air bubbles used in flotation processes have a diameter of 30–80 $\mu$m and cannot be produced by simply injecting air directly into water, for instance. Microscopic air bubbles intended for drinking water flotation processes are normally produced by releasing pressurized air into clean water from a pressure vessel. The highest possible degree of saturation is sought for in this regard. This water, normally referred to as dispersion water, is conducted to an inlet for water that has undergone a flocculation process, so-called flocculated water, and which is situated at the bottom of the flotation tank, while maintaining the high pressure of said water, and is there delivered to the flocculated water through separate nozzles or jets which are constructed to generate an instantaneous decrease in pressure to a level at which the air dissolved in the water is released in the form of microscopic bubbles and forms a dispersion of air in the water.

Those pressure vessels used to produce highly pressurized dispersion water that has been saturated with air to the greatest possible extent are normally kept half-filled with water with the aid of control equipment and associated water level sensing means. Compressed air is delivered to the air-filled space above the water surface and the water is often delivered through a nozzle mounted in a vessel side wall in the air-filled space. This water is injected onto the opposing vessel side wall such that the water jet will disintegrate to some extent as it impinges thereon.

The flotation method provides a considerably shorter water purification time, and the shortened through-passage time enables purification plants to be made smaller without impairing their earlier capacity. This reduction in the space requirement of purification plants opens new avenues of use However, the method does not only carry with it certain advantages. Thus, the method also makes the purification method more expensive, because water that has already been purified is recycled and used to produce dispersion water In order for the method to be made economical, refined methods are required to maintain the Consumption of dispersion water at a low level, pertly by endeavouring to increase the degree of air saturation in the dispersion water, and partly by improving dispersion as the dispersion water flows in to the flotation tank.

As previously mentioned, the dispersion water is introduced into the flotation tank through a number of nozzles, each of which includes a throttle valve which achieves the instantaneous decrease in the pressure of the dispersion water required to release the air in said water and therewith form microscopic bubbles The nozzles are often mounted in a rake-like configuration on one side of a distributor pipe or conduit means that has a length of several meters and to which the water is delivered through a feeder pipe mounted midway along the distributor pipe, essentially at right angles to the nozzles. With regard to the rake-like configuration of the nozzles, the feeder pipe can be likened to the hole in which the rake handle is fitted A "rake" can include twenty-five nozzles screwed into sleeves welded on the distribution pipe. Distribution pipes complete with nozzles are relatively expensive, and when the nozzles are made of plastic, the nozzles are easily damaged, for instance when cleaning the tanks.

SUMMARY OF THE INVENTION

The object of the present invention is to provide a liquid container which includes means that will distribute and disperse pressurized gas saturated liquid to a high degree of effectiveness and efficiency. Another object is to provide such a means which is both robust and relatively cheap to manufacture. These objects are achieved with a liquid container having the characteristic features set forth in the following claims

BRIEF DESCRIPTION OF THE DRAWINGS

The invention will now be described in more detail with reference to an exemplifying embodiment thereof and also with reference to the accompanying drawings, in which.

DESCRIPTION OF A PREFERRED EMBODIMENT

Figure 1:
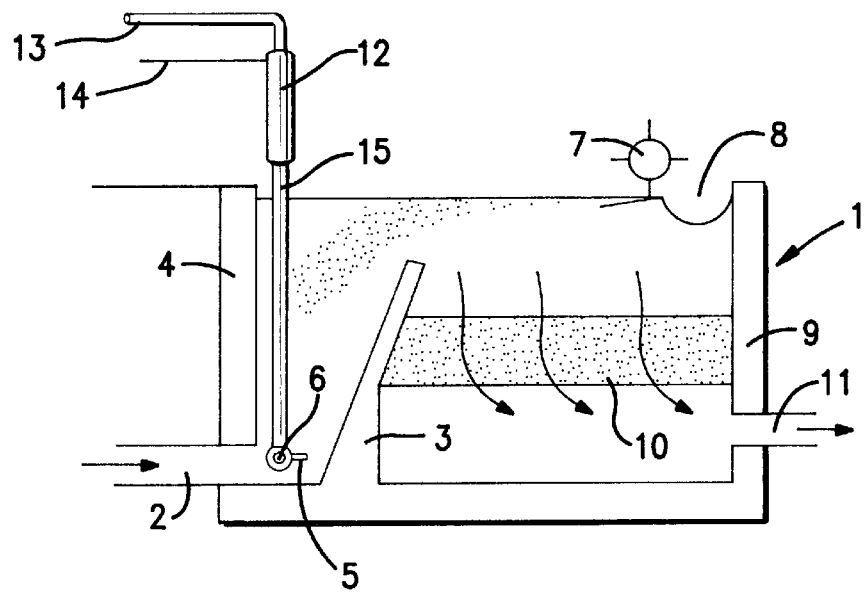
FIG. 1 is a schematic sectioned side view of a conventionally equipped flotation tank.

FIG. 1 is a schematic, sectioned side view of a conventionally equipped flotation tank generally referenced 1. The tank includes an inlet 2 to which water is delivered from a flocculation chamber, not shown. The water is caused to flow upwards in the tank 1, by an inclined barrier or baffle 3 mounted inwardly of the inlet 2. There is formed between the tank wall 4 and the baffle 3 a pocket into which an array of nozzles or jets 5 mounted on a horizontally extending distribution pipe 6 discharge. The pipe 6 functions to deliver air-saturated water, dispersion water, to the flocculated water flowing into the tank through the inlet 2, wherein the pressurized injected dispersion water speeds up the movement of the flocculated water. The nozzles or jets 5 are constructed to cause the pressure of the dispersion water to be lowered instantaneously, therewith releasing air from the dispersion water and forming microscopic bubbles which, as they travel towards the surface of the water collect particles and particle flocs and move the major part of these particles and flocs quickly to the surface of the water and there form a covering of slime, which is removed and deposited in a slime chute 8 located adjacent the tank wall 9 with the aid of some fort of slime scraper 7, or is removed in some other way Heavy particles which cannot be collected by the microscopic bubbles and lifted to the surface are captured in a filter 10 disposed between the rear side of the baffle 3 and the tank wall 9 and through which the cleaned or purified water passes on its way to a purified water tank (not shown) through an outlet 11. Part of the purified water is pumped from the clean water tar at high pressure to the water inlet 13 of a pressure vessel 12. The pressure vessel 12, in which the dispersion water is produced, is supplied with compressed air from a compressor (not shown) through an air intake 14, and the air-saturated water is then fed back to the nozzles 5 mounted in the flotation tank 1, via an outlet 15 and the distribution pipe 6.

Figure 2:
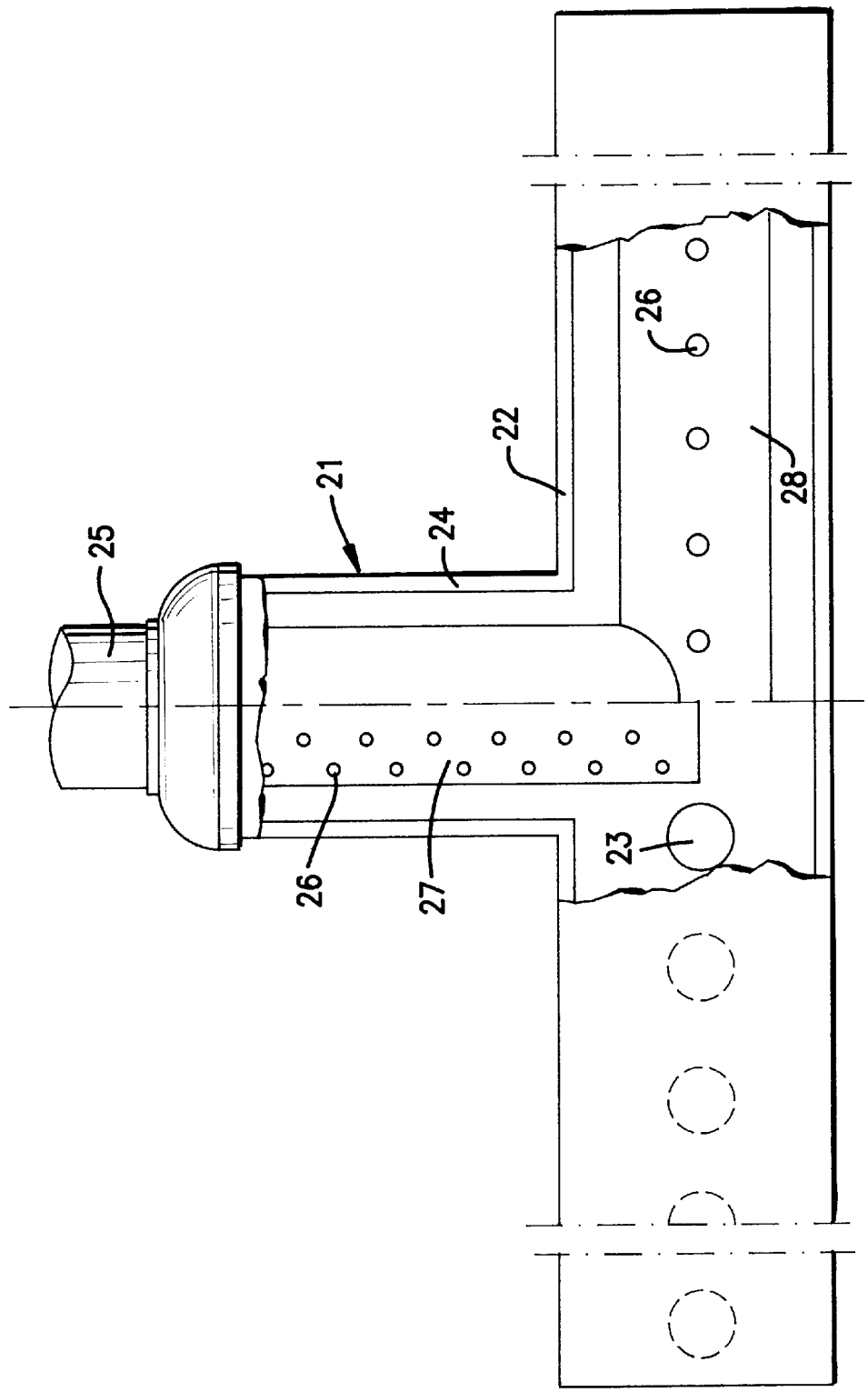
FIG. 2 is a partially sectioned front view of inventive means for distributing and dispersing air-saturated water.

FIG. 2 is a schematic, partially sectioned front view of inventive means generally referenced 21, for distributing and dispersing air-saturated water. The distribution and dispersion means includes a casing comprised partly of a horizontally extending distribution pipe having dispersion water outlet holes 23 disposed along one side thereof (the rear side in the Figure), and partly a pipe connection 24 mounted midway along the distribution pipe and to which a dispersion water feeder pipe 25 is connected. Mounted within the casing is a pre-disperser having dispersion water throttling holes 26 through which the dispersion water is forced to pass prior to arriving at the distribution pipe 22, therewith lowering the pressure of the dispersion water and effecting a certain degree of pre-dispersion FIG. 2 shows two embodiments of the pre-disperser, one in each half of the Figure. The pre-disperser 27 shown to the left of the symmetry line is accommodated essentially in the pipe connector 24 and is comprised of a container which has been provided with throttle holes 26 and into which the feeder pipe 25 discharges.

The reason why the air is only partly dispersed in the dispersion water as the dispersion water passes through the holes 26 is due to the fact that the pressure decrease is not total, since part of the pressure is retained in the distribution pipe 22. Final equalization of the pressure and dispersion of the air does not take place until the pre-dispersed water passes through the outlet holes 23. Because the holes 23 are positioned close together and are uniformly distributed, this dispersion in two steps is much more effective than dispersion via nozzles 5, between which a certain area of backwater or quiet water occurs.

The pre-disperser 28 shown to the right of the symmetry line in FIG. 2 has the form of a pipe which is placed coaxially with the distribution pipe 22 and which has arranged along one side of the throttle holes 26 through which dispersion water delivered to the disperser 28 through the extension of the feeder pipe 25 is pressed out, wherein a certain degree of dispersion takes place in the aforedescribed manner prior to final dispersion upon passage through the holes 23. The holes 23 can be replaced with narrow horizontal slots or with a slot that extends longitudinally of the pipe.

Figure 3:
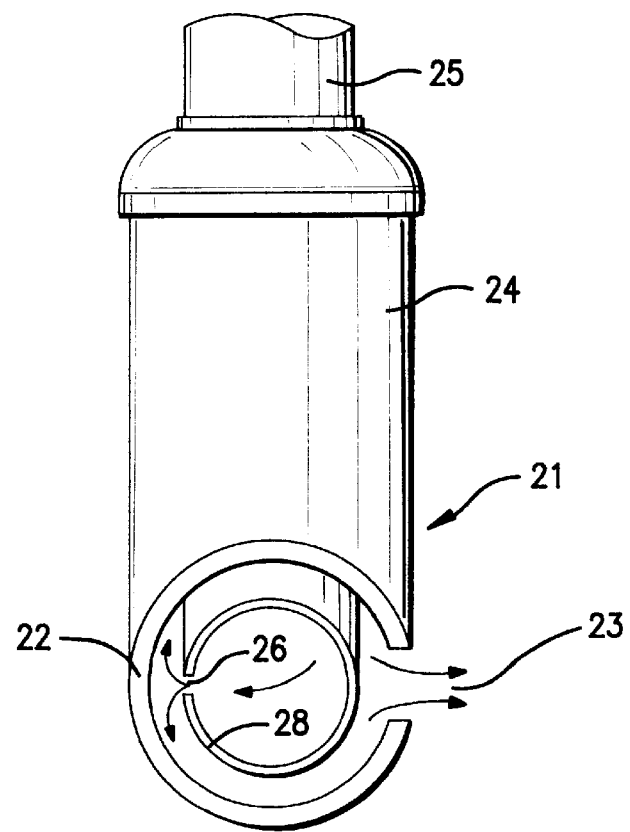
FIG. 3 is a partially sectioned side view of the means shown in FIG. 2.

The distribution and dispersion means shown on the right of FIG. 2 is also shown in a partially sectioned side view in FIG. 3. The various components are identified with the same reference signs used in FIG. 2. The directions in which the dispersion water flows in and between the two pipes is indicated with arrows. The embodiment of the pre-disperser 28 shown in FIG. 3 and in the right-hand part of FIG. 2 is particularly suited for use with long distribution pipes, whereas the pre-disperser 27 shown in the left-hand part of FIG. 2 is more suitable for short distribution pipes.

The water throttling holes 26 may be provided with the aid of a not which replaces the mantle surfaces of respective pre-dispersers 27 and 28 either completely or partially. The outlet holes 23 in the distribution pipe 22 may also be formed with the aid of a net.

In the case of certain applications, it is beneficial for the distribution pipe 22 to form a direct extension of the connector pipe 24.

Although the described and illustrated embodiment is concerned with the delivery of air-saturated water to a flotation tank in a water purification plant, it will be understood that the inventive concept can also be applied to other liquid containers and other gases and liquids.

I claim:

1. A liquid container (1) which includes a liquid inlet (2) and means (21) proximate to said inlet for delivering pressurized gas-saturated liquid to the liquid delivered through said inlet, characterized in that the delivery means (21) includes a distribution pipe means (22, 24) having an inner cylindrical wall, said delivering means(21) further including a pre-disperser pipe means (27,28) located inside of the distribution pipe means inner cylindrical wall and said pre-disperser pipe means (27,28) being connected to a gas saturated liquid delivery pipe (25), said pre-disperser pipe means (27,28) has at least one throttling hole (26) arranged to discharge liquid into the distribution pipe means in a direction substantially perpendicular to the inner cylindrical wall of said distribution pipe means, and that said distribution pipe means is provided with at least one dispersion water outlet hole (23) through which the dispersion water discharges directly into the container (1) while being exposed to an instantaneous pressure decrease.

2. A liquid container according to claim 1, characterized in that said container is a flotation tank (1) in a water purification plant.

3. A liquid container according to claim 1 characterized in that the distribution pipe means is constructed as an elongated distributor means (22, 24).

4. A liquid container according to claim 3, characterized in that the delivery pipe (25) is connected to the pre-disperser pipe means (28) between the ends thereof.

5. A liquid container according to claim 2, characterized in that the distribution pipe means is constructed as an elongated distributor means (22, 24).

6. A liquid container according to claim 5, characterized in that the delivery pipe (25) is connected to the pre-disperser pipe means (28) between the ends thereof.

7. A liquid container according to claim 1 wherein said at least said at least one throttling hole (26) is of a smaller diameter than said at least one dispersion water outlet hole (23).

8. A liquid container according to claim 7 including a plurality of said throtting holes (26) and a plurality of said dispersion water outlet holes (23).

* * * * *